United States Patent Office 2,996,458
Patented Aug. 15, 1961

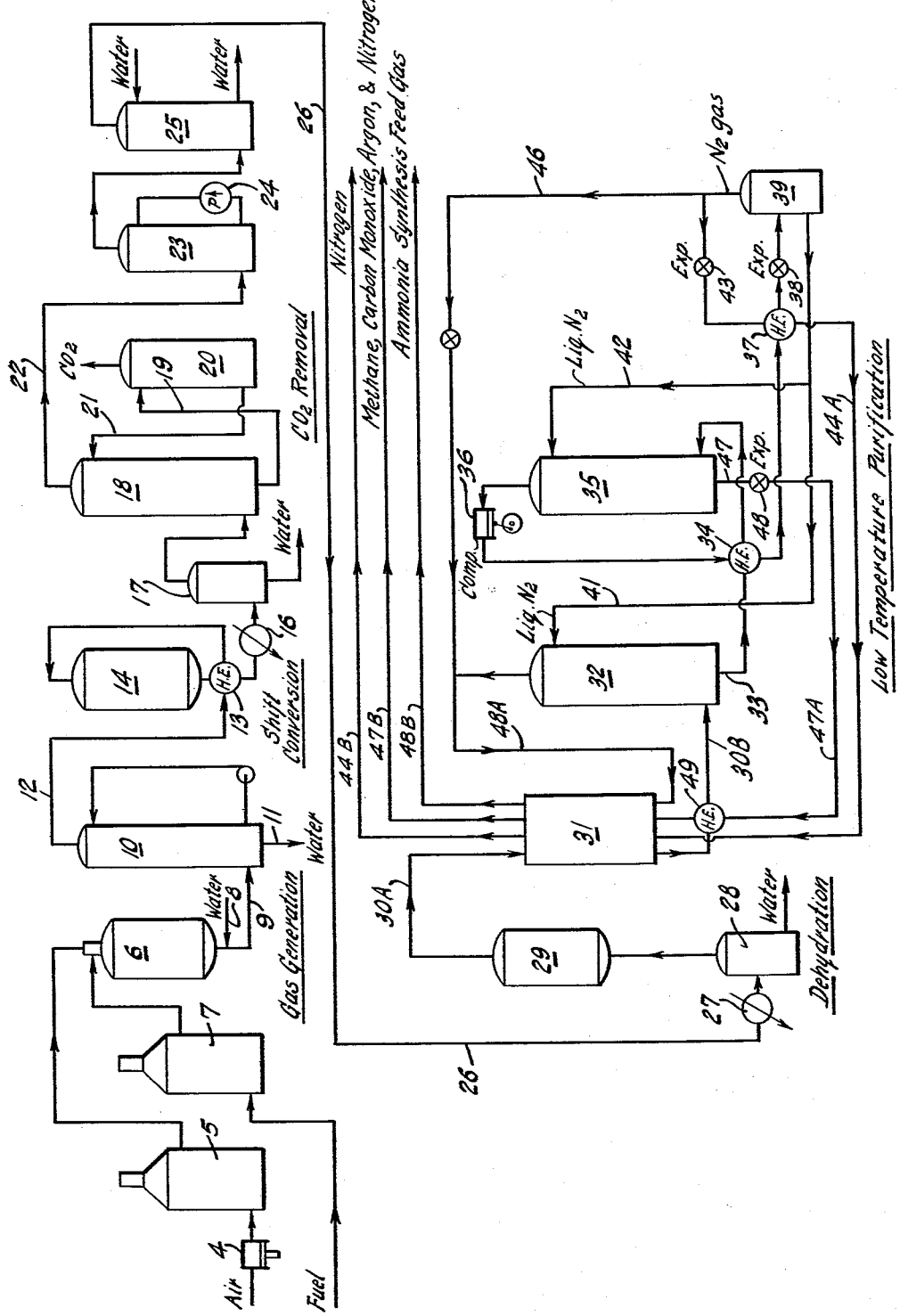

2,996,458
PRODUCTION OF HYDROGEN-NITROGEN MIXTURES
Thomas H. Whaley, Mount Vernon, N.Y., assignor to Texaco Inc., a corporation of Delaware
Filed Apr. 2, 1957, Ser. No. 650,274
3 Claims. (Cl. 252—374)

This invention relates to a process for the production of a mixture of hydrogen and nitrogen in predetermined proportions. In one of its more specific aspects, this invention relates to an improved process for the production of a mixture of hydrogen and nitrogen containing three parts hydrogen by volume per part of nitrogen.

In another specific aspect, this invention relates to an improved process for production of a mixture of hydrogen and nitrogen containing two parts hydrogen by volume per part of nitrogen.

This application is a continuation-in-part of my copending application Serial No. 420,411, filed April 1, 1954, now Patent No. 2,795,559.

Various methods have been devised for the production of hydrogen and for blending hydrogen with nitrogen in the required proportions for the synthesis of ammonia. In the synthesis of ammonia, three volumes of hydrogen are required per volume of nitrogen. Carbonaceous fuels including coke, coal, oil, and gaseous hydrocarbons may be utilized for the production of hydrogen. The carbonaceous fuel may, for example, be subjected to partial oxidation by reaction with a suitable oxygen-containing reactant, e.g. oxygen, steam, carbon dioxide, or a readily reducible metal oxide, to produce carbon monoxide, often accompanied by the simultaneous production of hydrogen. The carbon monoxide may then be reacted with steam in the so-called water gas shift conversion reaction to produce carbon dioxide and hydrogen; one volume of hydrogen is produced for each volume of carbon monoxide reacted. Carbon monoxide is, mol for mol or volume for volume, the equivalent of hydrogen in this process since every mol of carbon monoxide converted to carbon dioxide in the water gas shift reaction results in the production of a mol of hydrogen.

The present invention involves the generation of raw synthesis gas, i.e. carbon monoxide or a mixture of carbon monoxide and hydrogen, from a carbonaceous fuel by reaction of the fuel with an oxygen-containing gas in which free oxygen is supplied by air. Oxygen in combined form may also be used for reaction with the carbonaceous fuel. Steam and carbon dioxide are examples of suitable reactants which may be used in conjunction with the air to supply part of the oxygen for the reaction. The reaction of fuel with air is an exothermic reaction, while the reaction with steam or carbon dioxide is endothermic. By balancing the supply of air and endothermic reactant, the desired reaction temperature is autogenously maintained. In general, when the fuel consists essentially of methane, it is desirable to use little or no endothermic reactant. With heavier hydrocarbons, increased amounts of endothermic reactant may be used. Substantial amounts of endothermic reactant may be used in the production of synthesis gas from solid fuels, e.g. coal or coke.

With oxidizing gas mixtures in which air supplies all of the free oxygen directly, a large amount of nitrogen appears in the product gas from the synthesis gas generator. In the process of this invention, the excess nitrogen is removed, together with other impurities in the gas stream, to produce a very pure mixture of hydrogen and nitrogen eminently suitable for the synthesis of ammonia.

According to the process of this invention, a carbonaceous fuel is reacted with an oxidizing gas comprising air under conditions effecting substantially complete conversion of the carbon of the fuel to carbon monoxide. The reaction is conducted at a temperature above about 2,200° F. insuring complete consumption of the free oxygen. The resulting gas comprises carbon monoxide, hydrogen, nitrogen, and argon, together with small amounts of carbon dioxide and unconverted hydrocarbon, and is substantially completely devoid of free, or uncombined, oxygen. A small amount of hydrocarbon, predominantly methane, appears in the gas stream even when coke is used as the fuel; apparently methane is synthesized in the gasification reactor. Solid particles and readily condensible liquids are removed from the raw synthesis gas which is then subjected to shift conversion to convert the carbon monoxide to carbon dioxide with the simultaneous production of hydrogen; the resulting gas stream is treated for the removal of carbon dioxide and water, subjected to partial liquefaction to condense excess nitrogen, and rectified to separate the excess nitrogen and other impurities from the desired hydrogen-nitrogen mixture. The resulting product is a very pure hydrogen-nitrogen mixture, particularly suitable for the production of ammonia. The process permits exact adjustment of the composition of the hydrogen-nitrogen mixture. While a mixture of three mols hydrogen per mol of nitrogen is required for the synthesis of ammonia, mixtures of hydrogen and nitrogen in other proportions, for example, two mols hydrogen per mol of nitrogen may be produced by the process of this invention.

An object of the present invention is to provide an improved process for the preparation of a mixture of nitrogen and hydrogen.

A specific object is to provide an improved process for the preparation of ammonia synthesis feed gas.

Another specific object is to provide a process for the preparation of a mixture of two parts hydrogen by volume per part nitrogen.

Another object is to provide a process for producing ammonia synthesis feed gas essentially free from unreactive gases.

Still another object is to provide a process for producing ammonia synthesis feed gas by partial oxidation of carbonaceous fuels without the necessity of pure oxygen.

A further object is to provide a process for producing high purity nitrogen-hydrogen mixtures.

The process of this invention will be readily understood from the following description, with reference to the accompanying drawing. The drawing is a diagrammatic flow sheet illustrating a specific example of the application of this invention to the generation of ammonia synthesis feed gas from natural gas.

With reference to the drawing, air is compressed in compressor 4 and passed through preheater 5 into synthesis gas generator 6. Natural gas is passed through preheater 7 into the generator. The preheated air and natural gas streams are intimately mixed with one another and permitted to react with one another in a closed, compact reaction zone autogenously maintained at a temperature above about 2,200° F. The reaction zone is free from packing and catalyst.

The partial oxidation reaction may be conducted at atmospheric pressure; preferably an elevated pressure above about 100 pounds per square inch, suitably within the range of 100 to 600 p.s.i., is maintained in the reactor. The reaction temperature is autogenously maintained in the range of 2,200 to 3,000° F., suitably 2,600° F., by preheating the reactants and by supplying an excess of oxygen over and above that amount required for conversion of all of the carbon in the fuel to carbon monoxide. The amount of oxygen supplied to the reaction zone is preferably kept at a minimum consistent with disappearance of substantially all of the hydrocarbon from the product gas. The hydrocarbon content of the product gas stream is less than 3 mol percent, preferably less than 1 mol percent. The product consists principally of nitrogen, carbon monoxide and hydrogen, is substantially completely free from uncombined oxygen, and contains small amounts of unconverted hydrocarbon, water vapor, and carbon dioxide.

The effluent stream from the reaction zone is contacted with water introduced through line 8, rapidly cooling the product gas stream to a temperature below about 800° F. and preferably to a temperature of about the boiling point of water at the existing pressure, e.g. 470° F. at 500 p.s.i.g. The cooled gas stream is passed through line 9 to a scrubber 10 where solids, e.g. carbon or ash, are separated from the gas stream. Because of the high nitrogen content of the gas stream at this point, sufficient steam or water vapor is picked up to supply the requirements for the shift converter. Excess water containing solids may be discharged from the scrubber through line 11. The gas stream from the scrubbing tower saturated with water vapor is passed through line 12 to a heat exchanger 13 where it is heated and then to shift converter 14 wherein the carbon monoxide contained in the gas is reacted with steam contained therein to produce carbon dioxide and hydrogen. The shift conversion reaction is somewhat exothermic so that the gases leaving the shift conversion reactor are at a higher temperature than the gas entering the reactor. The effluent gases from the shift conversion reactor preheat the feed gas stream in heat exchanger 13.

The conversion of carbon monoxide to carbon dioxide by reaction with steam to produce additional hydrogen is usually conducted at about 600 to 750° F. over an iron catalyst. A commercial catalyst for this reaction comprises iron oxide promoted with oxides of chromium, potassium, magnesium and aluminum. The conversion of carbon monoxide to carbon dioxide by the water-gas shift reaction is essentially complete.

The effluent from the shift converter after partial cooling in heat exchanger 13 is further cooled in cooler 16 to condense unreacted steam. Cooling of the gas stream to about 100° F. is generally sufficient for condensing and removing most of the residual steam. Condensate is separated from the gas in separator 17.

After removal of condensate, the gas stream is passed to an absorber 18 where carbon dioxide is separated from the gas stream. Carbon dioxide may be removed from the product gas stream by scrubbing the gas with a suitable solvent, for example, water or an amine, e.g. monoethanolamine, or by a combination of solvents.

In this particular example, the gas is counter-currently contacted in absorber 18 with monoethanolamine (MEA) solution for the removal of carbon dioxide. The MEA solution containing absorbed carbon dioxide is drawn from the bottom of absorber 18 and passed through line 19 into stripper 20 wherein the carbon dioxide is driven off by heating. The regenerated MEA solution is returned through line 21 to the top of the absorber 18 into contact with the gas stream.

The gas stream leaving the MEA absorber through line 22 consists essentially of hydrogen and nitrogen, but still contains inert atmospheric gases (predominantly argon) and small amounts of carbon dioxide, carbon monoxide, and methane.

Residual carbon monoxide may be substantially completely removed from the gas stream by scrubbing with an aqueous solution of cuprous ammonium chloride ($Cu(NH_3)_2Cl$) which also removes any remaining carbon dioxide. Various other salts may be used for the removal of carbon monoxide, as is known in the art. While carbon monoxide may be removed from the gas stream by absorption, if desired, it is generally not necessary in the operation of the process of this invention.

In this example, the gas stream from line 22 is passed to caustic scrubber 23 wherein it is contacted with an aqueous solution of sodium hydroxide, containing 10 percent by weight of sodium hydroxide, substantially completely removing residual carbon dioxide. The caustic solution is continuously recirculated from the bottom to the top of the scrubber by pump 24. Fresh caustic solution is added to the scrubber 23 and part of the solution discarded therefrom, as required, to maintain the required caustic solution concentration. From the caustic scrubber 23, the gas stream is passed to a water scrubber 25 wherein the gas is washed with water to remove traces of solution carried over with the gas from the caustic scrubber.

After removal of carbon dioxide, the gas stream is dehydrated. In this example, the gas is passed through line 26 to a cooler 27 where most of the water contained in the gas stream is condensed. The resulting condensate is separated from the gas in a separator or trap 28. Cooling the gas stream to a temperature on the order of 40° F. will, in general, give adequate condensation of water vapor prior to chemical dehydration. The partially dehydrated gas from separator 28 passes through a drier 29 containing a desiccant to substantially completely eliminate water vapor from the gas stream. Alumina, silica gel and sulfuric acid are suitable desiccants.

The dry gas stream resulting after dehydration is cooled by an amount sufficient to condense the excess nitrogen and higher boiling impurities including argon, carbon monoxide, and methane. The partially liquified gas stream is subjected to rectification to separate a mixture of substantially pure hydrogen and nitrogen from excess nitrogen, argon, carbon monoxide and methane.

The dry gas stream from drier 29 is passed through line 30A through a suitable arrangement of heat exchangers 31 into a rectifying column 32. Final traces of carbon dioxide and water vapor contained in the gas stream deposit as solids on the surfaces of the heat exchanger elements. A suitable arrangement of switching valves, not illustrated, may be provided to permit deriming of the heat exchanger elements. Waste gas, e.g. excess nitrogen in pure form or admixed with impurities, leaving the rectification system may be employed to vaporize the deposited solids and remove them from the heat exchanger surfaces.

The cooled gas stream is introduced through line 30B into rectifying column 32. In the rectifying column, the stream flowing upwardly through the column is contacted with a downwardly flowing stream of liquid nitrogen reflux produced by fractional distillation, as will be explained in more detail hereinafter. Rectifying column 32 is provided with means for insuring intimate countercurrent contact between the liquid and gas streams within the column, e.g. packing or bubble trays. Liquid nitrogen is introduced as reflux at the top of tower 32. Argon, carbon monoxide and methane are concentrated at the bottom of the tower and removed, together with excess nitrogen and sufficient nitrogen for reflux, through line 34. Gas leaving the top of the tower contains nitrogen and hydrogen substantially completely free from the unwanted components.

The liquid stream withdrawn from the bottom of the column through line 33, comprising nitrogen and impurities, is passed through heat exchanger 34, where it is warmed, into fractionating column 35. Rectifying column 35 is provided with means for effecting intimate countercurrent contact between gas and liquid, e.g. bubble trays or packing. This column separates substantially pure nitrogen from the mixture of nitrogen, argon, methane and carbon monoxide from column 32. Pure liquid nitrogen so obtained is supplied to the top of column 32 as reflux.

Gaseous nitrogen leaving the top of the rectifying column 35 is passed to a compressor 36 where its pressure is increased and then through heat exchanger 34 where it is cooled by evaporation of a portion of the tower bottoms from column 32, then passed through heat exchanger 37 and expanded through expander 38 into an accumulator 39. The liquified portion is essentially pure nitrogen substantially free from other constituents.

Compression and subsequent expansion of the gas stream from the top of the rectifying column is not essential to operation. Under some conditions, e.g. when the column is operated at sufficient elevated pressure, sufficient reflux may be condensed in the heat exchanger without further compression by expansion of the overhead product from rectifying column 35. It will be apparent, also, that a supplemental refrigeration cycle may be employed and that, if desired, at least a part of the initial liquefaction may be provided by supplemental refrigeration of the feed gas stream to rectifying column 32.

Liquid condensate from accumulator 39 is supplied to the top of the rectifying column 32 as reflux through line 41 and to the top of the rectifying column 35 as reflux through line 42. Uncondensed gases discharged from the accumulator are expanded in expander 43, passed through heat exchanger 37 through line 44A and heat exchanger 31, and discharged as waste gas through line 44B. Part of this gaseous nitrogen may be passed through line 46 into admixture with the nitrogen-hydrogen mixture passing overhead of column 32 to adjust the composition of the mixture.

Unwanted components of the raw synthesis gas: methane, argon, and residual carbon monoxide, are withdrawn from the base of fractionating column 35 through line 47. Excess nitrogen may also be contained in the stream withdrawn through line 47. After pressure reduction in expander 48, liquid from the base of column 35 passes through line 47A to a heat exchanger 49, where liquid is vaporized precooling and condensing part of the feed stream to column 32. Heat exchanger 49 may be an integral part of heat exchange system 31; preferably system 31 is a gas to gas heat exchange system. After vaporization, the cold gas stream from heat exchanger 49 passes through exchanger 31 cooling the incoming gas stream, and the resulting gas comprising methane, carbon monoxide and argon, optionally containing some nitrogen, is discharged through line 47B. By a suitable switching arrangement, not illustrated, the gases passing through heat exchange system 31 from line 47A may be used to pick up impurities deposited on the heat exchanger elements by incoming gas from line 30A. The gas from line 47B is useful as fuel.

Expanders 38 and 43 may be reducing valves or tubular pressure reducing sections of restricted cross-sectional area; preferably they are expansion engines or turbines which do work and increase the available refrigeration.

Gas passing overhead from column 32 consists of nitrogen and hydrogen substantially completely free from unwanted gases, such as methane, carbon oxides and rare atmospheric gases, including argon. (Throughout this description, argon is used for convenience as a generic term to cover the rare atmospheric gases of which argon is the most abundant.) The mixture of nitrogen and hydrogen from rectifier 32 is discharged through line 48A, passed through heat exchanger 31, and delivered as final product gas through line 48B. Substantially pure nitrogen from accumulator 39 may be passed through line 46, as required, to accurately adjust the composition of the purified gas stream.

The synthesis of ammonia (not illustrated) is effected by reacting nitrogen with hydrogen in the presence of a suitable catalyst. In the usual commercial processes, the ammonia synthesis reaction is conduced at a pressure of several thousand pounds per square inch, suitably 5,000 and higher, and at an elevated temperature suitably around 950° F. One of the commercial catalysts is prepared by admixing oxides of potassium and aluminum as promoters with magnetic iron oxide which is subsequently reduced to metallic iron. In commercial operations, low conversion per pass is obtained, i.e. only a limited amount of the nitrogen-hydrogen mixture is converted to ammonia each time it passes over the catalyst. Commonly, from 8 to 12 percent of the feed mixture is converted per pass over the catalyst. Unconverted nitrogen and hydrogen are recycled. Roughly 90 percent of the feed to the converter represents recycled gas.

Undesirable gases, notably hydrocarbons and inert atmospheric gases, tend to accumulate in the conversion section of the ammonia synthesis gas. To prevent build-up in concentration of undesirable gases in the converter, it is customary to purge a portion of the recycled gas stream. As a result of this purge, generally only about 85 percent of the hydrogen, which has been made and purified at considerable expense, is ultimately converted to ammonia. The present process, by substantially completely eliminating inert gas from the feed stream to the ammonia synthesis reactor prevents most of this wasteful loss of hydrogen.

While the foregoing detailed description has been directed specifically to the generation of ammonia synthesis feed gas from natural gas, it is to be understood that other carbonaceous fuels may be employed as the source of the raw synthesis gas as will be evident from the following examples.

EXAMPLE 1

Natural gas of the following composition is preheated to 1,100° F. and charged to a synthesis gas generator where it is mixed with air preheated to 1,100° F.

*Natural gas composition*

| Component: | Mol percent |
|---|---|
| Methane | 82.3 |
| Ethane | 6.6 |
| Propane | 5.4 |
| Butane | 1.5 |
| Pentane | 0.5 |
| Carbon dioxide | 0.9 |
| Nitrogen | 2.6 |
| Oxygen | 0.2 |

This natural gas is fed at the rate of 48,100 standard cubic feet per hour while air is fed at the rate of 213,000 standard cubic feet per hour. The generator is operated at 350 p.s.i.g. with an autogenously maintained temperature of 2,600° F.

The product gas from the generator has the following approximate composition on a dry basis.

*Raw synthesis gas composition*

| Component: | Mol percent |
|---|---|
| Carbon monoxide | 15.9 |
| Hydrogen | 23.2 |
| Nitrogen | 57.7 |
| Argon | 0.7 |
| Carbon dioxide | 2.3 |
| Methane | 0.2 |

The raw synthesis gas (289,500 s.c.f.h.) is cooled to 430° F. by direct contact with water in a quenching and scrubbing operation which effects removal of carbon from the gas stream and saturates the gas stream with water vapor. The gas stream is reheated to 700° F. by heat exchange with the shift converter product and passed over an iron shift conversion catalyst. The product gas from the shift converter contains approximately 2 percent by volume residual carbon monoxide on a dry, carbon dioxide-free basis. The effluent from the shift converter at 320 p.s.i.g. is cooled to 110° F., condensate is separated therefrom, and the gas is passed through an absorber where it is contacted with monoethanolamine solution entering the absorber at 110° F. Effluent from the MEA absorber is subjected to a caustic wash and a water wash, then cooled to about 40° F. under a pressure of about 295 p.s.i.g. Condensate is separated from the gas stream and the partially dried gas passed through a drier containing alumina which reduces the water vapor content of the gas to less than 2 p.p.m. (parts per million by volume). The dry gas stream is cooled to −325° F. in reversing heat exchangers, condensing a portion thereof, and passed into a rectifying column operating at 275 p.s.i.g. Nitrogen, together with the argon, methane, and carbon monoxide, is withdrawn from the bottom of the column as liquid, subjected to fractionation to recover liquid nitrogen as reflux for the rectifying column, and the excess nitrogen, together with the argon, methane and carbon monoxide passed in heat exchange at substantially atmospheric pressure with the incoming feed stream. The product gas stream contains three mols of hydrogen per mol of nitrogen, less than about 0.3 mol percent methane, less than 10 p.p.m. argon (by volume) and less than one p.p.m. carbon monoxide.

EXAMPLE 2

A Kansas cycle gas oil from refinery operations having an API gravity of 4.5 and a Saybolt Furol viscosity of 259 at 122° F. is used as fuel. This oil has the following approximate analysis:

*Ultimate analysis of oil*

| Component: | Weight percent |
|---|---|
| Carbon | 89.0 |
| Hydrogen | 9.0 |
| Nitrogen | 1.0 |
| Sulfur | 1.0 |

The oil is preheated, atomized with steam, and reacted with air in a flow-type gas generator at 2,630° F. and 350 p.s.i.g. The oil and steam mixture enters the generator at 550° F., the air, at 150° F. The raw synthesis gas has the following approximate analysis on a dry basis:

*Raw synthesis gas analysis*

| Component: | Mol percent |
|---|---|
| Hydrogen | 16.0 |
| Carbon monoxide | 18.0 |
| Carbon dioxide | 6.6 |
| Nitrogen and argon | 59.1 |
| Methane | 0.2 |
| Hydrogen sulfide | 0.1 |

The feed to the generator consists of 64,605 s.c.f.h. of air, 807 pounds per hour of oil, and 244 pounds per hour of steam. This yields 86,276 s.c.f.h. of dry raw synthesis gas of the foregoing composition.

The raw gas is treated as in Example 1 to yield a 3:1 hydrogen-nitrogen mixture for ammonia synthesis. The hydrogen sulfide is removed with carbon dioxide in the carbon dioxide removal steps described above in the detailed description.

EXAMPLE 3

Utah bituminous coal is gasified with steam and air in a flow-type gas generator operated at 2,650° F. and 210 p.s.i.g. The coal has the following approximate ultimate analysis:

*Ultimate analysis of coal*

| | Wt. percent |
|---|---|
| Carbon | 74.1 |
| Hydrogen | 5.4 |
| Oxygen | 10.4 |
| Nitrogen | 1.3 |
| Sulfur | 0.6 |
| Ash | 8.2 |

The coal is suspended in steam and the mixture supplied to the generator at a temperature of 450° F. The air is supplied at 150° F. The generator is fed at the rate of 771 pounds of coal, 251 pounds of steam and 44,530 s.c.f. of air per hour. The generator produces 57,290 s.c.f.h. of dry raw synthesis gas of the following approximate analysis on a dry basis:

*Raw synthesis gas composition*

| Component: | Mol percent |
|---|---|
| Hydrogen | 11.6 |
| Carbon monoxide | 16.5 |
| Carbon dioxide | 9.6 |
| Nitrogen | 61.7 |
| Methane | 0.5 |
| Hydrogen sulfide | 0.1 |

The raw synthesis gas is processed as described above in the detailed description of the process to produce a hydrogen-nitrogen mixture for ammonia synthesis.

From the foregoing specific examples illustrating the operation of the present invention, it will be evident that the process of this invention is adaptable to the production of nitrogen-hydrogen mixtures from various carbonaceous fuels. A 3:1 (by volume) hydrogen-nitrogen mixture is suitable for the synthesis of ammonia; a 2:1 mixture may be useful for the production of hydrazine.

Obviously, many modifications and variations of the invention, as hereinbefore set forth, may be made without departing from the spirit and scope thereof, and only such limitations should be imposed as are indicated in the appended claims.

I claim:

1. A process for the production of a purified mixture of hydrogen and nitrogen substantially completely free from higher boiling constituents and containing approximately three volumes of hydrogen per volume of nitrogen wherein an impure gaseous mixture of hydrogen and nitrogen containing unwanted gaseous constituents including argon, carbon monoxide and methane and containing nitrogen in excess of one volume for each three volumes of hydrogen is processed at an elevated pressure above 100 pounds per square inch gauge for the removal of excess nitrogen and said unwanted gaseous constituents, comprising cooling said impure gaseous mixture at said elevated pressure effecting condensation of a substantial portion of said excess nitrogen and said unwanted constituents, thereafter contacting the uncondensed portion of said gaseous mixture with substantially pure liquid nitrogen in countercurrent flow in a contacting zone effecting substantially complete condensation and removal of said constituents other than hydrogen and nitrogen from the gas stream and producing a purified mixture of hydrogen and nitrogen containing substantially three volumes of hydrogen per volume of nitrogen substantially free from said unwanted gaseous constituents, withdrawing from said contacting zone impure nitrogen in liquid phase in excess of that equal to one third of the hydrogen thus purified and containing said unwanted constituents, subjecting said impure nitrogen to rectification in a separate rectification step effecting separation of purified nitrogen substantially completely free from said constituents higher boiling than nitrogen, condensing at least a portion of said purified nitrogen from said rectification step, and supplying resulting condensed purified liquid nitrogen to said contacting zone as the sole source of liquid nitrogen therefor.

2. A process as defined in claim 1 wherein nitrogen containing said unwanted constituents in liquid phase is subjected to pressure reduction and vaporization in heat exchange with said impure gaseous mixture supplied to said contacting zone effecting partial condensation of nitrogen and unwanted constituents from said impure gaseous mixture.

3. A process as defined in claim 1 wherein uncondensed nitrogen from said liquefaction step is expanded to substantially atmospheric pressure and said expanded gaseous nitrogen is passed in heat exchange with compressed nitrogen from said rectification step to effect condensation thereof.

References Cited in the file of this patent

UNITED STATES PATENTS

| | | |
|---|---|---|
| 1,723,425 | Jaubert | Aug. 6, 1929 |
| 1,840,833 | Claude et al. | Jan. 12, 1932 |
| 2,293,601 | Etienne | Aug. 18, 1942 |
| 2,545,778 | Haringhuizen | Mar. 20, 1951 |
| 2,685,181 | Schlitt | Aug. 3, 1954 |
| 2,795,559 | Whaley | June 11, 1957 |
| 2,838,460 | Stratford | June 10, 1958 |
| 2,865,864 | Eastman et al. | Dec. 23, 1958 |